(12) United States Patent
Sahai et al.

(10) Patent No.: US 11,266,160 B2
(45) Date of Patent: *Mar. 8, 2022

(54) NITROGEN INFUSED SOLUBLE COLD BREW INSTANT COFFEE AND PROCESS FOR PREPARATION

(71) Applicant: NESTEC S.A., Vevey (CH)

(72) Inventors: Deepak Sahai, Dublin, OH (US); Cecile Gehin-Delval, Les Hopitaux Neufs (FR); Federico Mora, Morges (CH); Amber Christine Scarlatos, Marysville, OH (US); Brett Koller, Columbus, OH (US)

(73) Assignee: Societe des Produits Nestle S.A., Vevey (CH)

( * ) Notice: Subject to any disclaimer, the term of this patent is extended or adjusted under 35 U.S.C. 154(b) by 208 days.

This patent is subject to a terminal disclaimer.

(21) Appl. No.: 16/308,712

(22) PCT Filed: Jun. 8, 2017

(86) PCT No.: PCT/EP2017/064025
§ 371 (c)(1),
(2) Date: Dec. 10, 2018

(87) PCT Pub. No.: WO2017/211987
PCT Pub. Date: Dec. 14, 2017

(65) Prior Publication Data
US 2019/0142026 A1    May 16, 2019

(30) Foreign Application Priority Data
Jun. 10, 2016 (EP) ..................................... 16173954

(51) Int. Cl.
| A23F 5/26 | (2006.01) |
| A23F 5/42 | (2006.01) |
| A23F 5/14 | (2006.01) |
| A23F 5/22 | (2006.01) |
| B67D 1/00 | (2006.01) |
| A23F 5/24 | (2006.01) |
| A23F 5/32 | (2006.01) |

(52) U.S. Cl.
CPC .................. *A23F 5/42* (2013.01); *A23F 5/14* (2013.01); *A23F 5/22* (2013.01); *A23F 5/243* (2013.01); *A23F 5/26* (2013.01); *A23F 5/267* (2013.01); *A23F 5/32* (2013.01); *B67D 1/00* (2013.01)

(58) Field of Classification Search
CPC ............ A23V 2002/00; A23V 2300/14; A23V 2300/18; A23F 5/243; A23F 5/26; A23F 5/30; A23F 5/34; A23F 5/36; A23F 5/166; A23F 5/18; A23F 5/22; A23F 3/163; A23F 5/24; A23F 5/32; A23L 1/28
See application file for complete search history.

(56) References Cited

U.S. PATENT DOCUMENTS

| 3,458,320 | A |   | 7/1969  | Niven, Jr. |
| 3,682,649 | A | * | 8/1972  | Orozovich ................ A23F 5/26 426/390 |
| 5,358,725 | A |   | 10/1994 | Izumitani et al. |
| 7,419,692 | B1| * | 9/2008  | Kalenian ................... A23F 5/28 426/433 |
| 2008/0038421 | A1 |  | 2/2008 | Gretsch et al. |
| 2016/0007626 | A1 |  | 1/2016 | Choi et al. |
| 2019/0274327 | A1 | * | 9/2019 | Sahai ...................... A23F 5/185 |

FOREIGN PATENT DOCUMENTS

| CA | 907928 | 8/1972 |
| EP | 0159754 | 10/1985 |
| JP | S52139756 A | 11/1977 |
| WO | 0069274 | 11/2000 |
| WO | 2013019676 | 2/2013 |

OTHER PUBLICATIONS https://www.merriam-webster.com/dictionary/room%20temperature retrieved online Mar. 22, 2021 (Year: 2021).*
Handbook for Examination of Patents and Utility Models, Part II, Chapter 2, 56 pages.
Japan Patent Office Action Received for Application No. 2018-562942, dated Dec. 8, 2020, 10 pages.

* cited by examiner

*Primary Examiner* — Hong T Yoo
(74) *Attorney, Agent, or Firm* — K&L Gates LLP

(57) ABSTRACT

The present invention relates to a liquid coffee beverage comprising liquid coffee infused with nitrogen thus producing a refreshing cold foamy and creamy beverage.

5 Claims, 3 Drawing Sheets

NITROGEN INFUSED SOLUBLE COLD BREW INSTANT COFFEE AND PROCESS FOR PREPARATION

CROSS REFERENCE TO RELATED APPLICATIONS

The present application is a National Stage of International Application No. PCT/EP2017/064025, filed on Jun. 8, 2017, which claims priority to European Patent Application No. 16173954.5, filed on Jun. 10, 2016, the entire contents of which are being incorporated herein by reference.

FIELD OF INVENTION

The present invention relates to a nitrogen infused soluble cold brew instant coffee and processes for its preparation. In particular, the invention relates to dried coffee powders with improved properties of flavour and stability.

BACKGROUND

Today nitrogen gas is widely used to store and dispense carbonated beverages such as beer and soda. Coffee infused with nitrogen (for example "nitro coffee") has become a popular beverage recently. Nitro coffee is a typically a cold-brew coffee with dissolved nitrogen. Cold brew coffee is considered a low yield coffee with yields in the range of 10-15% and with coffee solids in the range of 0.5-1.5%. This cold beverage is very low in calories, contains no added sugar or alcohol and is entirely a natural product. A key aspect of such chilled beverage is the foam. Nitrogen bubbles show a spectacular cascading effect in cold coffee by first appearing through nucleation of the dissolved gas and sinking to bottom of the receiver (a mug or glass) followed by ascending to the surface while eventually forming an indulgent creamy foam layer. Coffee aromas in concentrates or ready-to-drink (RTD) is known to be not very stable, hence delivering cold brew high quality aroma is challenging. Furthermore for nitro coffee available today, a cold brew preparation must be done shortly before nitro coffee preparation, this involves an added efforts on breweries, coffee shops and/or bars to prepare a stock of liquid cold brew first which is typically an overnight process. It would be advantageous to have a cold brew in instant powder form which can be prepared anytime instantly. Instant coffee is soluble coffee powder that can be dissolved in water to provide a fast and convenient way for consumers to prepare coffee.

Coffee is typically prepared by brewing roasted and ground coffee beans in hot water. The flavour characteristics of the coffee are influenced by many factors, including the roasting conditions, the size of the ground particles, and the time in which the coffee grounds are in contact with the hot water during brewing.

Instant coffee can be produced by drying such a brew to form a powder; a typical drying method is freeze drying.

While instant coffee is valued by consumers for its convenience, it is known that such soluble coffee powders often have flavour characteristics that are different to those of freshly brewed coffee. Instant coffee is usually perceived as being less fresh by consumers who like fresh brewed coffee.

As consumers show increasing preference for freshly-brewed or even cold-brewed coffees, there is considerable commercial interest in the development of instant coffees that have improved flavour characteristics that more closely replicate the experience of drinking premium freshly brewed coffees, but which can advantageously be marketed as stable dried coffee powder in the existing format of a coffee jar. Such improved instant coffees would enable the targeting of consumers who prefer the taste of ultra-high quality fresh brewed or cold brewed coffee but like the convenience of instant coffee.

Due to the chemistry of freshly brewed, premium coffee, it is very difficult to dry it and make a sufficiently stable powder. A freeze dried powder prepared from a premium coffee brew can be highly hygroscopic (it attracts and absorbs water) with a tendency to form a "cake" or collapse in the jar.

A number of approaches have been used to try to address this problem.

Apart from nitro coffee described above, nitrogen is also used in trace amounts in packaged beverages to replace oxygen while packaging. WO2014176102 describes such an aseptic hot-brewed package coffee or expresso beverage containing trace amounts of nitrogen to replace oxygen in the package for increasing shelf-life of the beverage. EP0745329 described a carbonated coffee beverage which has been packaged under pressure in a pressure-resistant closed container, which beverage is based on coffee extract, and wherein the coffee beverage has been packaged in the closed container in the presence of $CO_2$ and nitrogen.

During conventional soluble coffee manufacturing, the extraction is done in two steps, the first extract is produced at or about boiling water temperatures and has flavour characteristics that are brew-like. The second extract from the pre-extracted grounds is produced at higher temperatures approximately 160° C.-204° C. and has strong bitter and "processed" flavour characters.

However, while the first extract has desirable characteristics, it is difficult to make a stable freeze dried coffee powder using this extract only because of its deficiency in high molecular weight compounds. Therefore to make an instant coffee powder that has good stability, both extracts are combined, thereby sacrificing some positive sensory attributes.

An alternative approach to making a stable instant coffee powder using only the first extract is to add bulking agents such as maltodextrins. However, with this method the coffee powder produced is no longer "100% coffee" and cannot be labelled as such.

There is therefore a need in the art for improved soluble instant coffee powders and processes for their production, that do not suffer from the above-described drawbacks.

SUMMARY OF THE INVENTION

The present invention addresses the above prior art problems (freshness and stability) by providing soluble instant coffee and processes for its preparation, as specified in the claims.

In one aspect, the invention provides a liquid coffee beverage comprising liquid coffee having anhydrocarbohydrate content between 10 and 20% w/w and nitrogen gas, wherein the liquid coffee is obtained from a soluble coffee powder. The advantage of using soluble coffee powder is that a liquid coffee can be prepared immediately and nitrogen gas can be infused to this mixture. This process avoids the cumbersome process of producing a cold brew coffee with long brewing periods lasting from 8 to 24 hours to prepare a liquid coffee.

In one embodiment the soluble coffee powder is obtained by a process comprising the steps of: (i) extracting coffee solids from roasted and ground coffee beans using water at a temperature of between 0 and 110° C. to obtain a first coffee extract; (ii) filtering the first coffee extract using a selectively-permeable membrane to reduce the concentration of low molecular weight components and provide a filtered coffee extract; (iii) drying the filtered coffee extract to form a dried coffee powder.

In another embodiment the soluble coffee powder is obtainable from a dried roast and ground coffee product comprising roast and ground coffee particles that are infused and/or coated with at least 10 weight % of soluble coffee solids and wherein said soluble coffee solids have been extracted at a temperature below 60° C. In one embodiment the dried roast and ground coffee product is blended with roast and ground coffee beans that were not infused and/or coated with soluble coffee solids or blended with spent ground coffee and/or with micronized roasted coffee.

In one embodiment of the present invention, the nitrogen is a pure nitrogen gas having at least 99.5% $N_2$.

In one aspect of the present invention, the dried roast and ground coffee product defined above comprises the steps of:
  a) extracting roast and ground coffee beans at a temperature below 60° C.;
  b) cooling the coffee extract of step a) to a temperature between 4° C. and 10° C.;
  c) mixing the cooled coffee extract of step b) with roast and ground coffee that was not extracted in step a) in a ratio of soluble coffee solids to roast and ground coffee between 1:1 and 1:10, thereby infusing and/or coating the roast and ground coffee particles with soluble coffee solids; and
  d) drying the infused and/or coated roast and ground coffee of step c).

In another aspect of the present invention, the dried roast and ground coffee product defined above comprises the steps of
  a) mixing roast and ground coffee with water at temperature below 60° C., in a ratio of roast and ground coffee to water between 1:1 and 1:5, thereby obtaining a slurry;
  b) extracting roast and ground coffee of the slurry in a vacuum chamber, by applying a pressure between 75 mbar and 400 mbar for between 1 and 12 minutes at temperature between 10° C. and 35° C.; and
  c) drying the slurry of step b).

Moreover, it was suprisingly found that nitrogen gas infused in to such a filtered coffee extract preparation provides a better foam volume which is stable over time.

In one embodiment, the water is at a temperature of between 0 and 100° C. (e.g. between 20 and 50° C., between 10 and 40° C., between 20 and 40° C., or between 20 and 30° C.).

In one embodiment, the water is at a temperature of about 0, 10, about 15, about 20, about 25, about 30, about 35, about 40, about 45, 50, 60, 70, 80, 90, 100, 110° C.

In one embodiment, the coffee extract is passed through a membrane that has a molecular weight cut off of 0.1-100 kDa. The membrane can be of organic or inorganic material.

In one embodiment, the dried coffee powder comprises a ratio of coffee compounds where the concentration of high molecular weight compounds to the concentration of low molecular weight compounds (as defined by the size exclusion chromatography technique) is at least 5.

In one embodiment, the filtered coffee extract is concentrated prior to drying, for example by reverse osmosis or low temperature vacuum evaporation.

In one embodiment, the filtered coffee extract is dried using freeze drying, vacuum belt drying or spray drying.

In one embodiment, coffee aroma is recovered prior to filtration and is subsequently blended with the filtered coffee extract prior to drying.

DETAILED DESCRIPTION OF THE INVENTION

Figure 1:
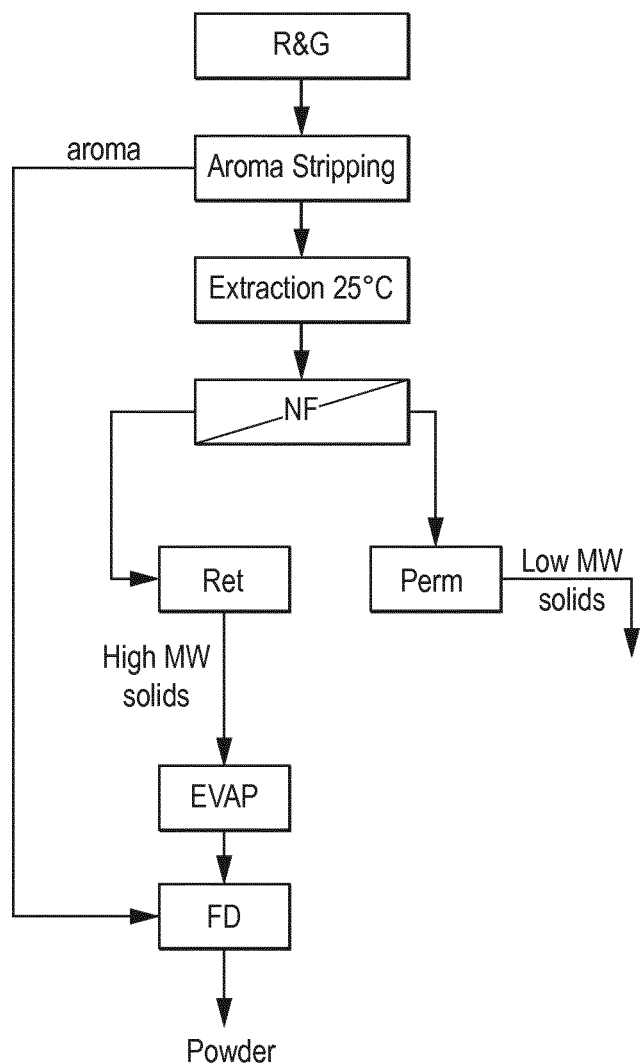
FIG. 1 presents a flow-chart showing an example process according to the invention.
Figure 2:
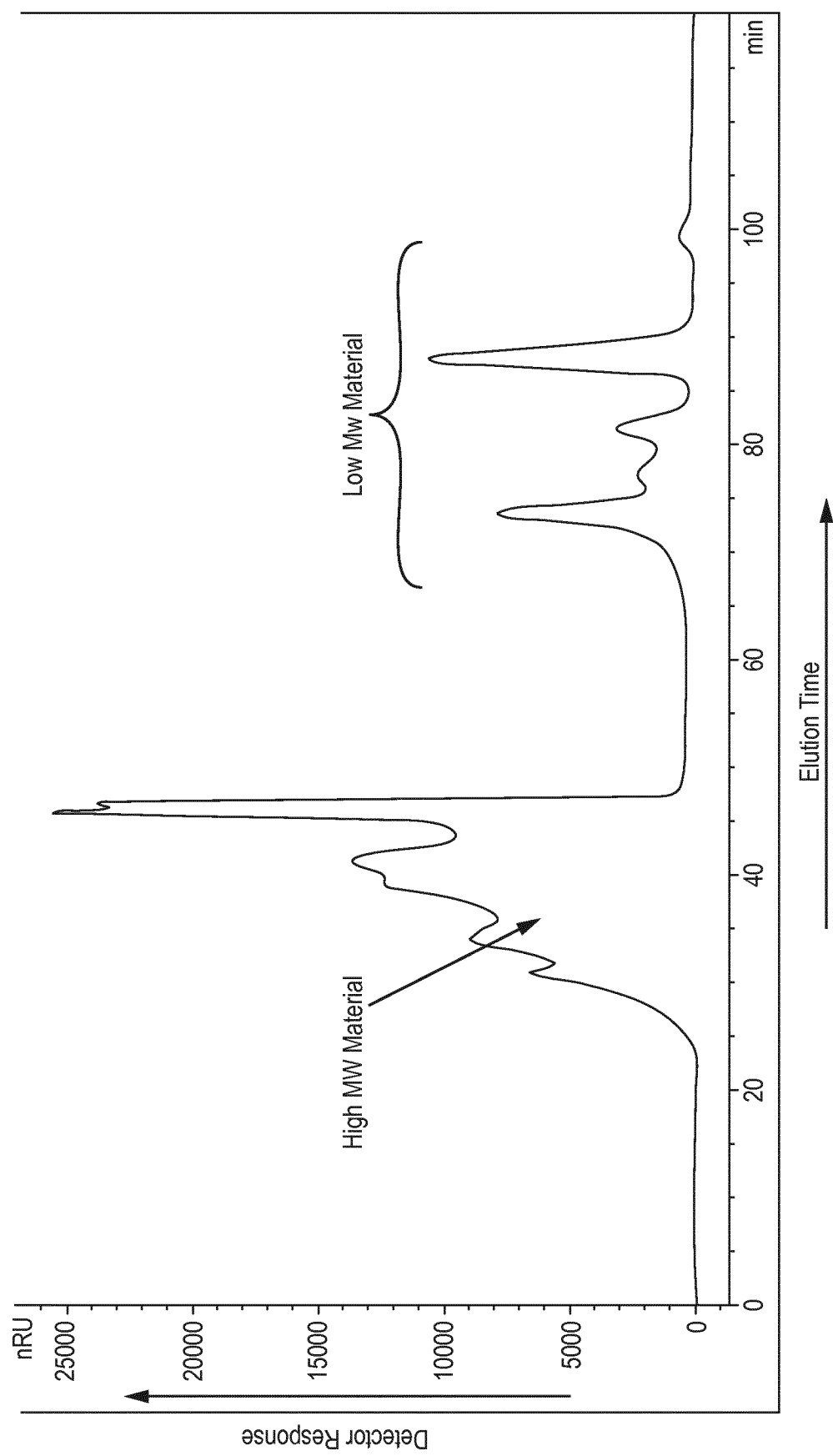
FIG. 2 presents an SEC chromatogram of a coffee extract produced using water at a temperature of 25° C.

According to the present invention the term "beverage" means any noncarbonated aqueous liquid material that is a homogeneous liquid substantially free of solids having a flavor due to dissolved components.

According to the present invention dispensing of the chilled beverage means opening a faucet/draft column of the system to allow the chilled "nitrogen infused" beverage to flow from the system into a receiver such as a glass, mug or other drinking container. Throughout the following description the term "nitrogen infused" will be used to describe a nitrogen rich coffee beverage having either $N_2$ or $N_2O$ or $N_2/CO_2$ or $N_2/N_2O/CO_2$ infused beverage. If an embodiment is directed specifically to a $N_2/CO_2$ mixture or specifically to only $N_2$ infusion, the actual gas composition is explicitly disclosed.

Dispensing of the nitrogen infused chilled beverage is an element of the present invention wherein reduction of pressure on the gas infused beverage allows the nucleation of the dissolved gas producing micro bubbles resulting in unique properties which distinguish the dispensed beverage by enhancement of the beverage's flavor and/or appearance. For instance appearance of foam and stability of foam over time and taste and aroma of coffee delivered through this beverage.

The term "anhydrocarbohydrate" refers to carbohydrate distribution of essentially mannose, arabinose and galactose. The total content ranges from 10 to 20% w/w. In one embodiment, the carbohydrate distribution of the coffee of the present invention may comprise for instance about 15.7 w/w % which comprises essentially 6.1% mannose; 6% galactose and 2.6% arabinose. In another embodiment, the carbohydrate distribution of the coffee of the present invention may comprise for instance about 10.7 w/w % which comprises essentially 3.3% mannose; 4% galactose and 3% arabinose. The anhydrocarbohydrate content is determined through high pressure chromatography using anion exchange stationary phase with amperometric detection and after compete hydrolysis fo the sample. Carbohydrate molecular weight distribution was performed using size exclusion chromatography. Then in line hydrolysis with sulfuric acid adding 3,5 dihydroxytoluen with colorimetric detection. Response is therefore proportional to total carbohydrates monomers as 3,5 dihydroxytoluen is selective with carbs.

The present invention provides a dried coffee powder obtainable by a process comprising membrane filtration of a low temperature extract of roasted and ground coffee beans to reduce the concentration of low molecular weight components and drying the filtered coffee extract.

The present inventors have discovered that a dried coffee powder suitable for use as an instant coffee and having highly desirable flavour characteristics of brewed coffee can be prepared by using membrane filtration to reduce the concentration of low molecular weight (LMW) components in a brewed coffee extract prior to a drying process. The dried coffee powder produced has good stability characteristics and low hygroscopicity, thus enabling it to be stored for long periods of time and making it suitable for use as an instant coffee. Morover, it was suprisingly found that nitrogen gas infused into and extract produced form the dried coffee powder provides a better foam volume which is stable over time.

The process of membrane filtration reduces the concentration of LMW components and provides a concomitant increase in the ratio of high molecular weight (HMW) components to LMW components in the filtered coffee extract.

By using membrane filtration to reduce the concentration of low molecular weight components in the brewed coffee extract, a stable instant coffee powder.

Extraction is the process by which coffee solids (e.g. soluble coffee solids) are extracted from roasted and ground coffee beans, typically using water, to form a solution referred to as a coffee extract.

The process of the invention is carried out using a low temperature extract of roasted and ground coffee beans. As used herein, the term "low temperature extract" is preferably a coffee extract obtained using water at a temperature of between 0 and 110° C.

The process of the invention uses membrane filtration to reduce the concentration of low molecular weight components of the coffee extract. Thus, the coffee extract is passed over a membrane which is selectively permeable to LMW components of the coffee extract, allowing these to be separated and thus reducing their concentration in the coffee extract. By reducing the concentration of LMW components, there is a concomitant increase in the ratio of HMW to LMW components.

In a preferred embodiment, the term "low molecular weight component" refers to compounds present in a coffee extract (coffee solids) that have a molecular weight of less than about 1 kDa (for example, less than about 0.9, 0.8, 0.7, 0.6 or 0.5 kDa), and the term "high molecular weight component" refers to compounds present in a coffee extract (coffee solids) that have a molecular weight greater than about 1kDa (for example, greater than about 1.1, 1.2, 1.3, 1.4 or 1.5 kDa).

The present inventors have discovered that a dried coffee powder having particularly advantageous properties (such as advantageous stability properties) is produced when the ratio of HMW to LMW components (as defined by the size exclusion chromatography technique) is at least 5 (for example, at least 5, at least 5.5, at least 6, at least 6.5, or at least 7).

The present invention provides a process for preparing a dried coffee powder, said process comprising membrane filtration of a low temperature extract of roasted and ground coffee beans to reduce the concentration of low molecular weight components and drying the filtered coffee extract.

In a preferred embodiment, the process comprises the steps of: (i) extracting coffee solids from roasted and ground coffee beans using water, preferably at a temperature of between 0 and 110° C., to obtain a first coffee extract; (ii) filtering the first coffee extract using a selectively-permeable membrane to reduce the concentration of low molecular weight components, wherein low molecular weight coffee solids that pass through the filter form a permeate. The high molecular weight coffee solids that are retained by the filter form a retentate; and (iii) drying the retentate to form a dried coffee powder.

The process of the present invention comprises a low temperature extraction using water, preferably at a temperature of between 0 and 110° C., to obtain a first coffee extract.

In one embodiment, the water is at a temperature of between 0 and 110° C. (for example, between 20 and 50° C., between 10 and 40° C., between 20 and 40° C., or between 20 and 30° C.). In one embodiment, the water is at a temperature of about 10, about 15, about 20, about 25, about 30, about 35, about 40, about 45, or about 50° C.

The roasted coffee beans are ground prior to extraction. Any suitable beans may be used. Methods for roasting and grinding coffee beans to obtain desired characteristics are well known in the art.

The extraction may be carried out in any suitable extraction vessel, for example fixed bed reactors or continuous counter-current extractors.

The extraction yield of a coffee extract refers to the percentage of coffee solids that are transferred (i.e. extracted) to the water during the extraction step. The extraction yield can be controlled using extraction water temperature and the ratio of water to beans. The inventors have found that coffee extracts produced with a low yield provide particular advantageous flavour characteristics when used in the process of the invention.

Following the extraction, a "first coffee extract" is obtained. The first coffee extract is filtered using a membrane, which enables a reduction in the concentration of LMW components (for example, components have a molecular weight less than about 1 kDa). The membrane is selectively permeable with a molecular weight cut-off value that allows only LMW components to pass through the membrane. In one embodiment, the membrane has a molecular weight cut-off of 1 kDa, meaning that compounds having a molecular weight of greater than about 1kDa are retained by the membrane.

Thus, coffee solids having a molecular weight less than the molecular weight cut-off value of the membrane (i.e. LMW components of the coffee extract) are able to pass through the filter while coffee solids having a molecular weight greater than the molecular weight cut-off value of the membrane (i.e. HMW components of the coffee extract) are unable to pass through the filter and are therefore retained in the coffee extract. Filtration using such a selectively-permeable membrane therefore separates the coffee extract into two different fractions: the LMW fraction that passes through the filter is referred to as the permeate, while the HMW fraction that is retained by the filter is referred to as the retentate.

The permeate may be alternatively recycled for use in a separate coffee product.

In one embodiment, the filtered coffee extract comprises a ratio of HMW components to LMW components of at least 5.

As discussed above, the present inventors have discovered that a dried coffee powder having particularly advantageous properties (such as stability properties) is produced when the concentration ratio of HMW components (for example, those having a molecular weight greater than about 1kDa) to the concentration of LMW components (for example, those having a molecular weight less than about 1kDa) is at least 5 (e.g. at least 5, at least 5.5, at least 6, at least 6.5, or at least 7).

To improve the efficiency of the filtration process, the retentate may be recycled and subjected to the filtration process multiple times.

The filtration step may be carried out using cross-flow filtration, in which the fluid flow is tangential to the surface of the membrane, or using "dead end" filtration, where the fluid flow is perpendicular to the membrane or any other membrane fractination technique.

Membranes suitable for use in the process of the invention include nanofiltration membranes having a molecular weight cut-off of 0.1-100 kDa.

Specifications of an example suitable membrane are as follows:

TABLE 1

An example of membrane properties

| Parameter | Specification |
| --- | --- |
| sucrose rejection at 70-145 psi | 45-75% |
| NaCl rejection at 70-145 psi | 50-60% |
| Operating pH range | 2-11 |
| Cleaning pH range | 1-12 |
| Maximum cleaning temperature | 50° C. |
| Typical operating temperature | 5-50° C. |
| Maximum chlorine concentration | <100 ppm |

Suitable membrane sizes will vary depending on the scale of the production process.

A diafiltration step may be carried out in combination with the filtration step. A diafiltration step consists of adding dilution water to the retentate product then removing a permeate fraction equivalent to the amount of added dilution water.

Following the filtration step, the retentate (i.e. the filtered coffee extract) is dried to form a soluble coffee powder.

Suitable processes for drying a coffee extract to produce a soluble coffee powder (an instant coffee) are known in the art and include freeze drying and spray drying. Thus, in one embodiment, the filtered coffee extract is freeze dried to form a dried coffee powder. In one embodiment, the filtered coffee extract is spray dried to form a dried coffee powder.

In a freeze drying process, a liquid coffee extract is frozen at about −20° C. to about −40° C., before being heated under low pressure conditions. Application of low pressures enables the frozen water component to be removed (such as by sublimation) without needing high temperatures, which could degrade the flavour and other characteristics of the coffee extract.

Spray drying is an alternative to freeze drying. In spray drying, a liquid coffee extract is sprayed through a small nozzle into a heated drying gas. This produces dried coffee particles which can subsequently be collected.

The process of the invention may comprise an additional concentration step prior to the drying step. Such a concentration step can be used to increase the strength of the coffee extract and improve the flavour characteristics. Thus, in one embodiment, the filtered coffee extract (the retentate) is concentrated prior to drying, optionally by reverse osmosis or low temperature vacuum evaporation, freeze concentration, or any other technique known in the art.

The aroma of coffee comes from multiple different chemical compounds which make up the aroma components. Coffee aroma is an important quality which can influence the taste and perception of coffee by consumers. If a coffee product lacks the aroma commonly associated with it, consumer perception of the coffee may be adversely affected. This can be a problem in the field of instant coffee, where processes of extraction, concentration and drying may reduce or remove the coffee aroma. For these reasons, it may be advantageous to recover coffee aromas which are given off during the processing of the coffee and to reintroduce these aromas to the coffee extract prior to drying.

Thus, in one embodiment, coffee aroma is extracted from the roasted and ground coffee beans prior to the extraction of the coffee solids, and said coffee aroma is subsequently blended with the filtered coffee extract prior to drying.

Processes for extracting coffee aromas and subsequently reintroducing them to coffee extracts prior to drying are known in the art. An example of a suitable process is vacuum extraction (VAX). Processes for recovering coffee aromas are described in WO 1999/052378 and WO 2001/013735.

The dried coffee powder of the invention has good stability properties, making it suitable for use as an instant coffee. Instant coffee is typically packaged and sold in jars, which are stored at room temperature for long periods of time. Thus, in one embodiment, the dried coffee powder of the invention is advantageously stable at room temperature for at least six months.

Those skilled in the art will understand that they can freely combine all features of the present invention described herein without departing from the scope of the invention as disclosed.

EXAMPLES

Various preferred features and embodiments of the present invention will now be described by way of non-limiting examples.

Example 1

Preparation of a Dried Coffee Powder.

An example flow-chart is shown in FIG. 1.

Coffee beans were roasted and ground. Coffee aroma was extracted from the roasted and ground beans using a vacuum extraction process; the coffee aroma was stored for later reintroduction into the process.

The aroma-extracted roasted grounds were introduced into an extractor and the coffee solids extracted using water at a temperature of 25° C. using water to coffee ratio of 4.0.

The above obtained coffee extract then underwent a nanofiltration process using a semi-permeable membrane with a molecular weight cut-off of 1kDa. Low molecular weight components were filtered into permeate, while high molecular weight components remained in the retentate.

The filtered coffee extract in the form of the retentate comprised the concentration of HMW and the concentration of LMW components at a ratio of approximately 5 (HMW to LMW, as defined by the SEC technique).

The filtered coffee extract was freeze dried to produce a stable dried coffee powder.

Example 2

Preparation Using Different Membranes

Various polymeric ultrafiltration (UF) and nano filtration (NF) membranes with molecular weight cut offs (MWCO) ranging between 500 and 20,000 Da were used to fractionate cold brew coffee extract during a series of preliminary bench scale screening experiments. The fractionations were conducted on a plate-and-frame unit equipped with 84 cm² of membrane area and operated at temperatures between 10-60° C. and pressures up to 30 bars.

The results from the initial screening tests identified NF membrane (molecular weight cut-off of 1 kDa) as a particularly suitable membrane for the fractionation of low temperature coffee extract. The selection of the membrane was based on its performance in terms of permeation flux, cleanability and its ability to fractionate and separate enough of the low molecular weight coffee compounds in the permeate so that the obtained retentate can be used to make a dryable product with superior sensory qualities.

Example 3

Preparation of Prototype Dried Coffee Powders.

Extraction trials were conducted using pilot plant scale extraction. To evaluate the impact of temperature on the extracts, three trials were done to produce coffee extracts at temperatures of 25°, 50° and 85° C.

The resulting extract was fractionated using a 2-module co-pilot scale nanofiltration system (11 m² membrane area) operated in the batch mode at ambient temperature. A concentration factor (CF) of 4.0 was achieved during initial fractionation. The retentate was further subjected to diafiltration to wash out more of the low molecular weight compounds from the retentate. The diafiltration step consisted of adding dilution water to the retentate product then removing a permeate fraction equivalent to the amount of added dilution water.

The results of the membrane performance in terms of permeation flux, solids recovery are summarized in Table 2.

TABLE 2

Membrane performance for producing coffee extract fractions
Permeation flux performance during nanofiltration of pre-E1 extracts

| | Processing conditions | Single cell pilot plant extraction Trial # | | | |
|---|---|---|---|---|---|
| | | Trial 1 | Trial 2 | Trial 3 | Trial 4 |
| Extraction | Temp. ° C. | 85 | 50 | 25 | 25 |
| | Total Solids | 4.51 | 3.9 | 2.41 | 2.1 |
| Nanofiltration | Applied pressure (bar) | 17-30 | 8 to 26 | 10 to 20 | 10 to 18 |
| | Avg Flux, L/m2 · h | 6.1 | 7.8 | 8.3 | 8.2 |
| | Avg. diaf. Flux | 6.8 | 6.8 | 7.3 | 7.5 |

Aroma was added to the diafiltered retentate to make the aromatized freeze-dried powders.

Example 4

Size-Exclusion Chromatography (SEC) Analysis.

Size-exclusion chromatography was used to analyse filtered coffee extracts produced using the process of the invention.

Coffee extract was separated using two size exclusion columns (Superose 60 and Superdex Peptide from GE Healthcare) connected in series in an HPLC (high performance liquid chromatography). Water was used as the mobile phase at a flow rate of 0.5 ml/minute. The peaks were visualized using a refractive index detector. The run time for the chromatogram was 120 minutes.

Figure 3:
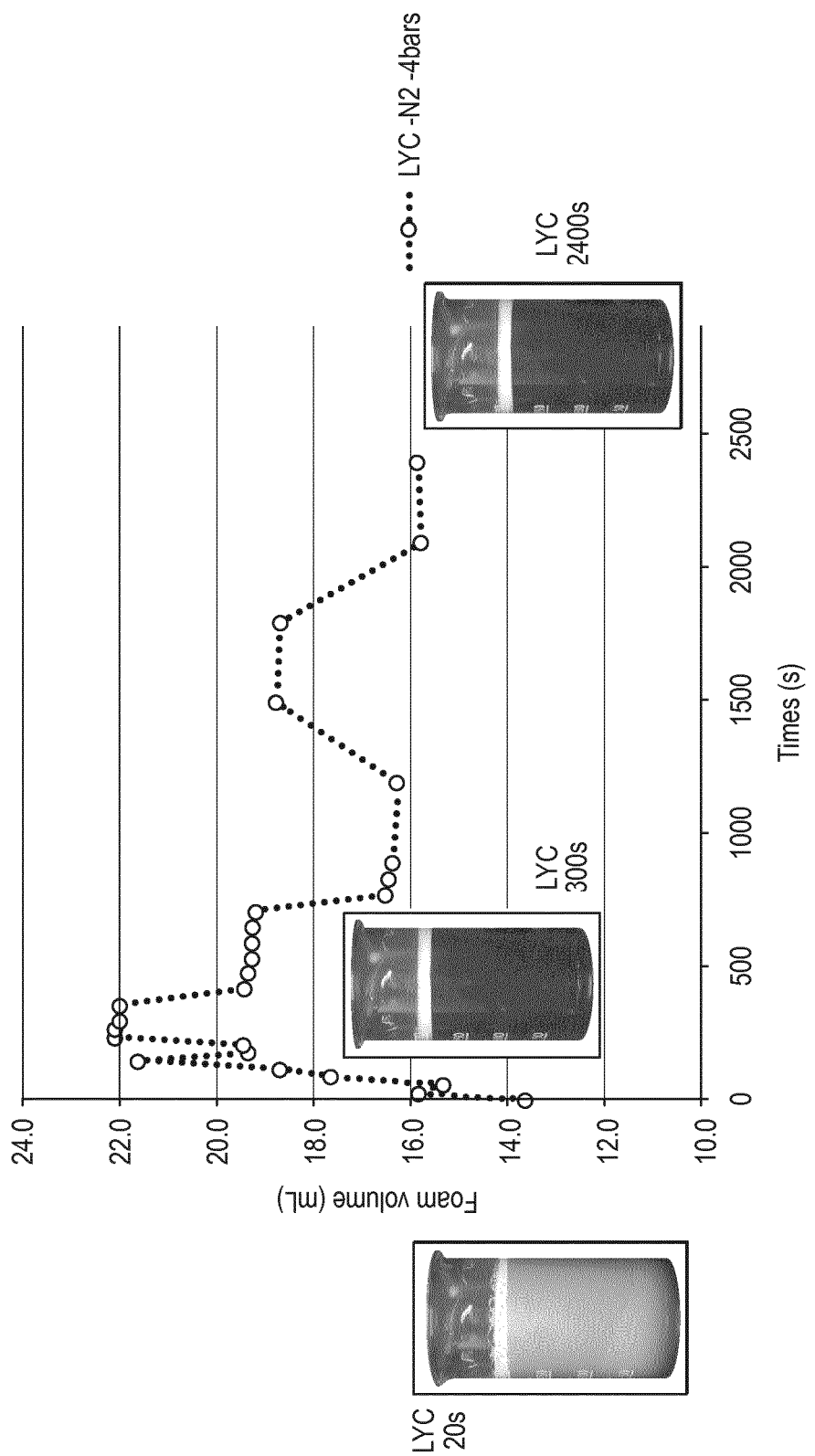
FIG. 3 presents a measurement of foam volume vs time using nitrogen infused coffee extract of the present invention.

It was possible to visualize the compounds forming the coffee extract. The SEC chromatogram showed two distinct peak clusters (FIG. 3). The material eluting before 60 minutes comprised high molecular weight compounds, while the peak cluster eluting after 60 minutes was low molecular weight compounds.

The peak area under the two peak clusters was determined. The ratio of the peak areas for the high molecular weight (HMW) materials peaks and the low molecular weight (LMW) material peaks was calculated.

A coffee extract produced for use in the process of the invention (25° C.) was analyzed using this technique. The SEC chromatogram was as shown in FIG. 3. The high molecular weight peak cluster and the low molecular weight peak clusters were visualized and the ratio of the high molecular weight compounds to low molecular weight compounds was calculated to be 5.0

The retentate produced using membrane with diafiltration, was further freeze dried into a dried coffee powder. The filtered extract formed a relatively stable powder when compared with the powder produced from the extract without to membrane filtration.

Example 5

Reference Sample

A coffee beverage was prepared by reconstituting a soluble coffee powder infused with nitrogen as described in WO2009/040249. This powder was used as a reference.

A liquid composition was obtained using 1.3 wt % of the stable powder made of $N_2$ loaded granules of soluble coffee, dipsersed into 4° C. water. Dissolution is bad and some lumps visible both in the beverge and in the foam. Foam level is very low and bubbles are very polydisperse.

Example 6

Preparation of Nitogen Gas Infused Cold Coffee Beverage.

A coffee solution of 30 liters, dosing at 1.3% coffee solids, in cold water was prepared using the stable powder as described in example 1. This solution was placed in a keg under pressure at 3-4 bar using Nitrogen gas. The Keg was placed in a cold room at 4-8C for 48 hours. The pressure was checked regularly to ensure minimum of 3 bars. After 48 hours, the keg was connected to a standard beer tap and to the nitrogen bottle to release the liquid through the beer tap. The beverage was served in a glass mug. A nice foamy and creamy beverage with cascading of foam was recorded.

Beverage Characterization

Beverage is dispensed through faucet in the form of an homogeneous foam made of fine bubbles dispersed homogeneously all over the beverage.

After beverage production, the bubbles are instantaneously creaming due to density difference between air and continuous liquid phase.

After 3 minutes, a large majority of bubble has creamed forming a foam layer on the top of the beverage: the coffee crema.

Coffee crema evolves over time due to bubble coalescence, Ostwald ripening and liquid drainage.

In order to characterize the beverage, photometry was used. A photographic picture of the sample is made using CoffeeCam (Newtone Technonogies, France) from top and/or side view in a controlled light environment followed by a robust and accurate image analysis in the CIE Lab colorimetric space.

In the specific case of layer detection (ie a coffee crema on top of a liquid coffee phase), a layer can be considered as a discontinuity in colour in the beverage.

Foam is also characterized regarding its texture with a standard Rheometer (Discovery HR2, TA Instruments, US) with a cup and vane geometry. A flow curve from 0.1 up to 100 s-1 is performed.

High shear viscosity and yield stress are used to defined foam rheology.

FIG. 3 shows foamability and foam stability measurement for the beverage of the present invention.

The invention claimed is:

1. A process for preparing a dried coffee powder, the process comprising:
   (i) extracting coffee solids from roasted and ground coffee beans using water at a temperature between 30° C. and 50° C. to obtain a first coffee extract;
   (ii) filtering the first coffee extract using a selectively-permeable membrane having a molecular weight cut-off of 1 kDa to reduce a concentration of low molecular weight components, wherein low molecular weight coffee solids that pass through the selectively-permeable membrane form a permeate, and high molecular weight coffee solids that are retained by the selectively-permeable membrane form a retentate; and
   (iii) drying the retentate to form the dried coffee powder, wherein the dried coffee powder has a concentration ratio of components having a molecular weight greater than 1 kDa to components having a molecular weight less than 1 kDa of at least 5.

2. The process according to claim 1 comprising concentrating the retentate prior to the drying.

3. The process according to claim 1, wherein the dried coffee powder has a concentration ratio of components having a molecular weight greater than 1 kDa to components having a molecular weight less than 1kDa of at least 7.

4. The process according to claim 1 comprising filtering the retentate at least once before the drying of the retentate.

5. The process according to claim 1, wherein the drying of the retentate comprises freeze drying and/or spray drying the retentate.

* * * * *